US008645386B2

(12) United States Patent
Hess et al.

(10) Patent No.: US 8,645,386 B2
(45) Date of Patent: Feb. 4, 2014

(54) PROCESSOR IMPLEMENTED SYSTEMS AND METHODS FOR USING THE CATALOG PART OF AN SQL IDENTIFIER TO EXPOSE/ACCESS HETEROGENEOUS DATA

(75) Inventors: Robert Brian Hess, Raleigh, NC (US); James Michael Beesley, Wake Forest, NC (US); David Kerr Jeffreys, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 13/035,630

(22) Filed: Feb. 25, 2011

(65) Prior Publication Data
US 2011/0213778 A1 Sep. 1, 2011

Related U.S. Application Data

(60) Provisional application No. 61/308,635, filed on Feb. 26, 2010.

(51) Int. Cl.
*G06F 7/00* (2006.01)
(52) U.S. Cl.
USPC .......................................................... 707/740
(58) Field of Classification Search
USPC ..................... 707/711, 740, 722, 696, 713
See application file for complete search history.

(56) References Cited

U.S. PATENT DOCUMENTS 7,493,311 B1 * 2/2009 Cutsinger et al. ............... 1/1
7,966,311 B2 * 6/2011 Haase ........................... 707/713
2004/0193567 A1 * 9/2004 Dettinger et al. ................. 707/1
2005/0044064 A1 * 2/2005 Haase ............................... 707/3
2007/0005658 A1 * 1/2007 Myllymaki ................... 707/200
2010/0125545 A1 * 5/2010 Navas ........................... 707/602
2010/0125574 A1 * 5/2010 Navas ........................... 707/722
2010/0250504 A1 * 9/2010 Balasubramanian et al. 707/696

OTHER PUBLICATIONS

Nadagi, Deepa et al., "Access heterogeneous data using Informix Enterprise Gateway Manager with ODBC or DRDA," downloaded from http://www.ibm.com/developerworks/data/library/techarticle/dm-0810nadagi/index.html on Sep. 22, 2010, 12 pp.
DataDirect, "ODBC Data Connectivity Resources," downloaded from http://web.datadirect.corn/resources/odbc.html on Sep. 23, 2010, 18 pp.
Embarcadero Developer Network, "Microsoft.Net Framework Data Access," downloaded from http://conferences.embarcadero.com/article/32275 on Sep. 23, 2010, 20 pp.

* cited by examiner

*Primary Examiner* — Hung T Vy
(74) *Attorney, Agent, or Firm* — Kilpatrick Townsend & Stockton LLP

(57) ABSTRACT

Systems and methods are provided for providing data from a plurality of databases stored on a plurality of disparate servers. A query is received for data from a plurality of databases stored on a plurality of disparate servers. An address for a first server is resolved that stores a first database identified by the catalog field in the query using a logical name-to-connection metadata map. A first sub-query is transmitted to the first server based on the received query, and a first sub-query response is received from the first server. The resolving, transmitting, and receiving are repeated for a second server. The first sub-query response and the second sub-query response are combined to generate a query response according to the received query, and the query response is transmitted.

15 Claims, 9 Drawing Sheets

US 8,645,386 B2

PROCESSOR IMPLEMENTED SYSTEMS AND METHODS FOR USING THE CATALOG PART OF AN SQL IDENTIFIER TO EXPOSE/ACCESS HETEROGENEOUS DATA

CROSS-REFERENCE TO RELATED APPLICATIONS

This application claims priority to U.S. Provisional Patent Application No. 61/308,635, filed Feb. 26, 2010, entitled "Processor Implemented Systems and Methods for Using the Catalog Part of a SQL Identifier to Expose/Access Heterogeneous Data." The entirety of which is herein incorporated by reference.

FIELD

The technology described herein relates generally to database access and more particularly to the use of a catalog part of an SQL identifier to access heterogeneous data.

BACKGROUND

Applications can require access to data stored in database servers (e.g., DBMS servers). Such access may be used to produce reports or execute other tasks. Oftentimes desired data is stored in a plurality of data stores, and sometimes these data stores are of disparate types that are accessed using different database access protocols. Such configurations provide difficulties in query formulation, where several queries may need to be generated by a user or application to access desired data.

SUMMARY

Systems and methods are provided for providing data from a plurality of databases stored on a plurality of disparate servers. A query for data from a plurality of databases stored on a plurality of disparate servers is received, where the query identifies the plurality of databases by a logical name in a catalog field of an object reference. This logical name is referred to as a 'logical catalog'. An address for a first server that stores a first database identified by the logical catalog in the query may be resolved using a logical name-to-address lookup table. A first sub-query may be transmitted to the first server based on the received query, and a first sub-query response may be received from the first server. An address for a second server that stores a second database identified by the logical catalog in the query may be resolved using the logical name-to-address lookup table. A second sub-query may be transmitted to the second server based on the received query, and a second sub-query response may be received from the second server. The first sub-query response and the second sub-query response may be combined to generate a query response according to the received query, and the query response may be transmitted.

As another example, a system for providing data from a plurality of databases stored on a plurality of disparate servers may include one or more data processors and a computer readable memory encoded with instructions for commanding the one or more data processors to execute a method. In the method, a query for data from a plurality of databases stored on a plurality of disparate servers is received, where the query identifies the plurality of databases by a logical catalog of an object reference. An address for a first server that stores a first database identified by the logical catalog in the query may be resolved using a logical name-to-connection metadata map. A first sub-query may be transmitted to the first server based on the received query, and a first sub-query response may be received from the first server. An address for a second server that stores a second database identified by the logical catalog in the query may be resolved using the logical name-to-connection metadata map. A second sub-query may be transmitted to the second server based on the received query, and a second sub-query response may be received from the second server. The first sub-query response and the second sub-query response may be combined to generate a query response according to the received query, and the query response may be transmitted.

As a further example, a computer-readable memory may be encoded with instructions for commanding one or more data processors to execute a method for providing data from a plurality of databases stored on a plurality of disparate servers. In the method, a query for data from a plurality of databases stored on a plurality of disparate servers is received, where the query identifies the plurality of databases by a logical catalog of an object reference. An address for a first server that stores a first database identified by the logical catalog in the query may be resolved using a logical name-to-address lookup table. A first sub-query may be transmitted to the first server based on the received query, and a first sub-query response may be received from the first server. An address for a second server that stores a second database identified by the logical catalog in the query may be resolved using the logical name-to-connection metadata map. A second sub-query may be transmitted to the second server based on the received query, and a second sub-query response may be received from the second server. The first sub-query response and the second sub-query response may be combined to generate a query response according to the received query, and the query response may be transmitted.

DETAILED DESCRIPTION

Figure 1:
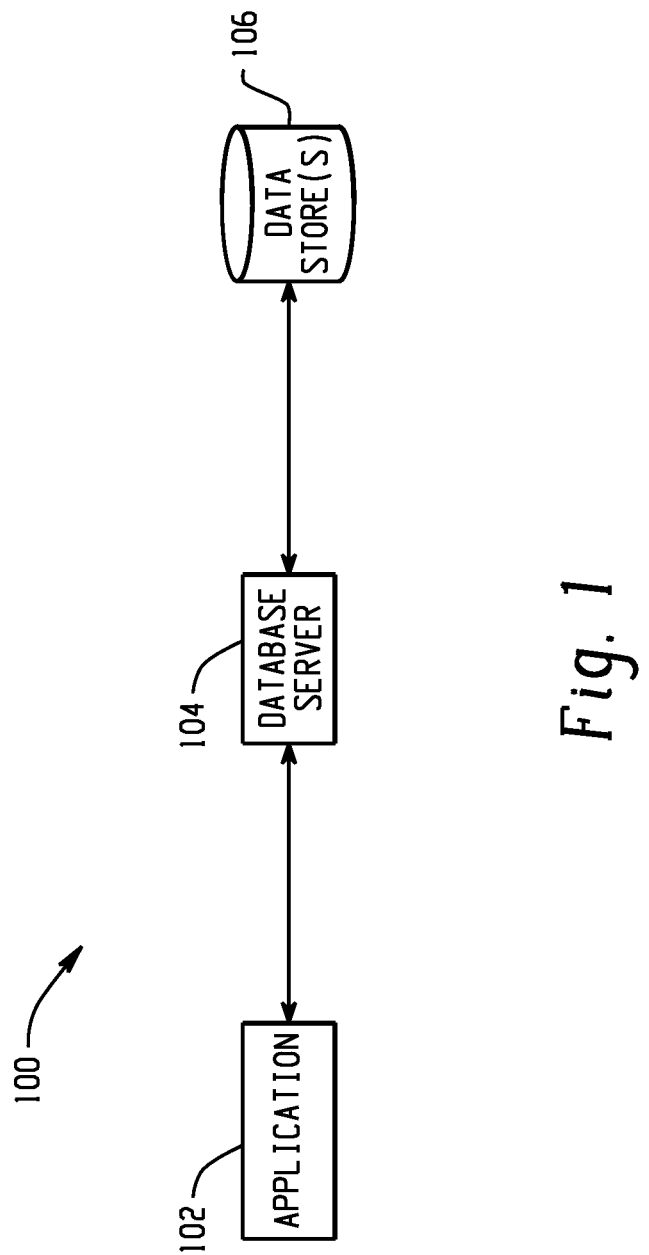
FIG. 1 depicts an example configuration for an application to access data from one or more homogeneous data stores.

FIG. 1 depicts an example configuration for an application to access data from one or more homogeneous data stores. To access data, the application 102 provides a query to a database server 104. The database server 104 parses the query and accesses one or more data stores 106 to fetch the data requested by the query. The database server 104 packages the fetched data and returns the data to the application 102 for subsequent use. Typically the database server 104 operates according to a particular protocol and each of the one or more data stores 106 responsive to the database server 104 is structured according to that particular protocol.

In some environments, it may be desired for an application to access data stored in multiple different databases (e.g., to generate a report). For example, for an online store, customer data may be stored in a relational database, inventory data may be stored in a multidimensional database, and sales data may be stored in a flat file (e.g., comma delimited) format. Because these multiple data stores are structured according to different protocols, a system (e.g., database server 104) may have difficulty handling a single query to simultaneously access data stored in these multiple different formats (e.g., DB2, Oracle, SQL Server, SAS Data Sets).

Figure 2:
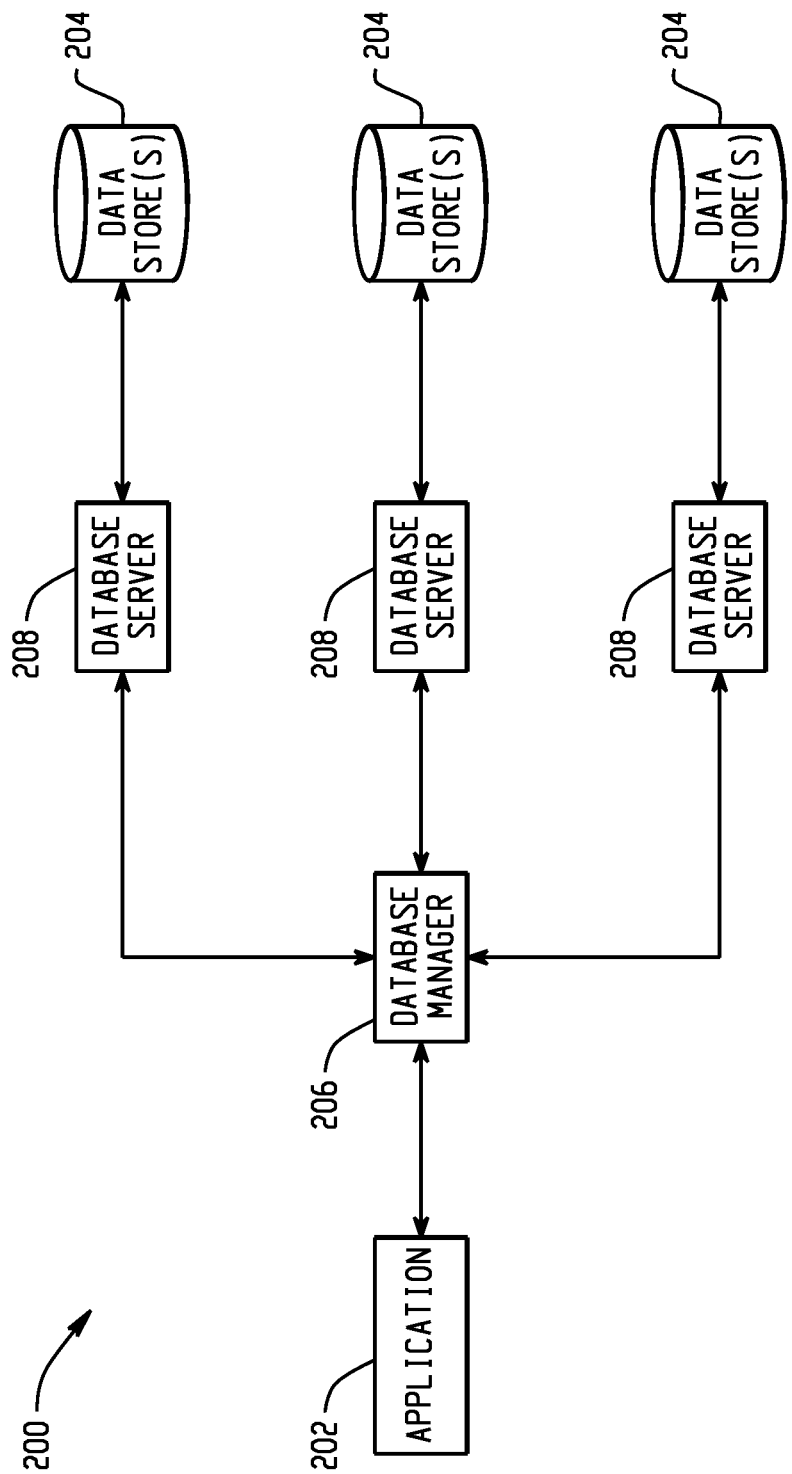
FIG. 2 is a block diagram depicting an example system for handling a single query seeking access to data stored according to multiple different protocols (i.e., heterogeneous data stores).

FIG. 2 is a block diagram depicting an example system for handling a single query seeking access to data stored according to multiple different protocols (i.e., heterogeneous data stores). The application 202 submits a single query for data from multiple different data stores 204 to a database manager 206. The database manager 206 recognizes that the query seeks data from disparate data stores 204 and divides the query into multiple sub-queries, where each sub-query seeks data from data stores 204 arranged according to one of the different protocols. The database manager 206 sends the sub-queries to corresponding database servers 208, which then access the requested data from the data stores 204. The database servers 208 send sub-query responses to the database manager 206. The database manager 206 combines the sub-query responses from the database servers 208 to generate a query response according to the received query from the application 202. The database manager 206 returns the query response to the application 202. It is noted that while the application 202, database manager 206, database server 208, and data stores 204 are depicted as separate entities in FIG. 2, the functions described above may be performed by a single entity or any combination of separate entities.

To access data stored in disparate data stores, a query from an application may identify those data sources sought to be accessed. However, the party seeking the data is not required to know that the data is coming from disparate data sources. This layer of abstraction, which may be desirable in many cases, may be implemented using the catalog part of an SQL identifier. Using a logical name-to-connection metadata map defined by an administrator role, a system can perform the query described with respect to FIG. 2 without the end user knowing the identity and/or location of the data source from which the data is accessed. The data can be referenced in a logical manner that provides the proper context to the user, while using a standard 3-part SQL identifier that includes the logical catalog name followed by the schema-qualified table names.

An example database manager supports logical catalogs, where each catalog is associated to a single data source, access to which is delegated through a driver connection. A data source may support multiple native catalogs, a single native catalog, or no native catalogs.

For example, a TSSQL driver may be utilized by a database manager when processing heterogeneous SQL commands. The driver may enable a client to view data from disparate databases transparently, as though they were located within a single database server. A client's SQL namespace may be limited by the available logical catalogs exposed through the database manager at connect time. The TSSQL driver may manage a set of underlying connections, each of which is associated with one or more catalog names. The mapping enables the driver to deconstruct single SQL queries into multiple homogeneous SQL sub-queries and delegate the sub-queries to the proper underlying connection identified by the logical catalog name. Query results are assimilated according to the constructs present in the original SQL command and returned to the client.

Users may issue standard DQL, DML, and DDL using 3-part SQL identifiers to operate on SQL entities across multiple underlying data sources by name. The 3-part SQL identifier is: catalog.schema.object. The catalog part of the identifier is a logical name referred to as a 'logical catalog' that enables the TSSQL driver to identify the correct underlying data source from which that object may be referenced. Clients may also utilize 2-part SQL identifiers, for example, if the underlying data source does not support schemas (e.g., catalog.object). In cases where a logical catalog identifier is not provided, a default logical catalog identifier may be provided by a database manager.

A data source is interfaced in the database manager through a data source driver. The TSSQL driver can load and delegate to multiple data source drivers to achieve transparent query federation. If a data source supports native catalogs, the driver to that data source may surface them by implementing a CATALOG=* syntax in its driver connection string (e.g., multi-catalog driver). If the data source does not support native catalogs, or it is not desirable to expose the native catalogs to the client, then the driver can support a CATALOG=<logical_catalog_name> connection string syntax (e.g., single catalog driver).

If a data source does support native catalogs, then the driver may implement a CATALOG=* driver connection string syntax and support SQL queries containing 3-part SQL identifier names. The "*" indicates that all native catalogs are to be exposed to the client by their original native names. It may be desirable to rename a native catalog name for database manager clients. In that case, a user or administrator may employ the catalog maps to generate such renaming.

When exposing native catalogs to users, it is possible that two different data sources might have catalogs by the same name. This could cause a connection to fail because catalog names may need to be unique within the scope of a connection. To solve this potential issue, the database manager may utilize the catalog maps. A catalog map allows for a transient renaming of a catalog (e.g., via CATALOG= (new_name1=old_name1; new_name2=old_name2; . . . )). Catalog name maps may be sparse in that they need only include those catalogs that require mapping. Any unique native catalog names surfaced by the data source may maintain their name. Catalog name maps may be supported by all CATALOG=* drivers.

A connection string is a mechanism for providing information to connect to a data source or set of data sources. The CATALOG option may be used to identify the logical catalogs that are available from the underlying data source. Connection strings may also be encapsulated in a data source name (DSN).

Figure 3:
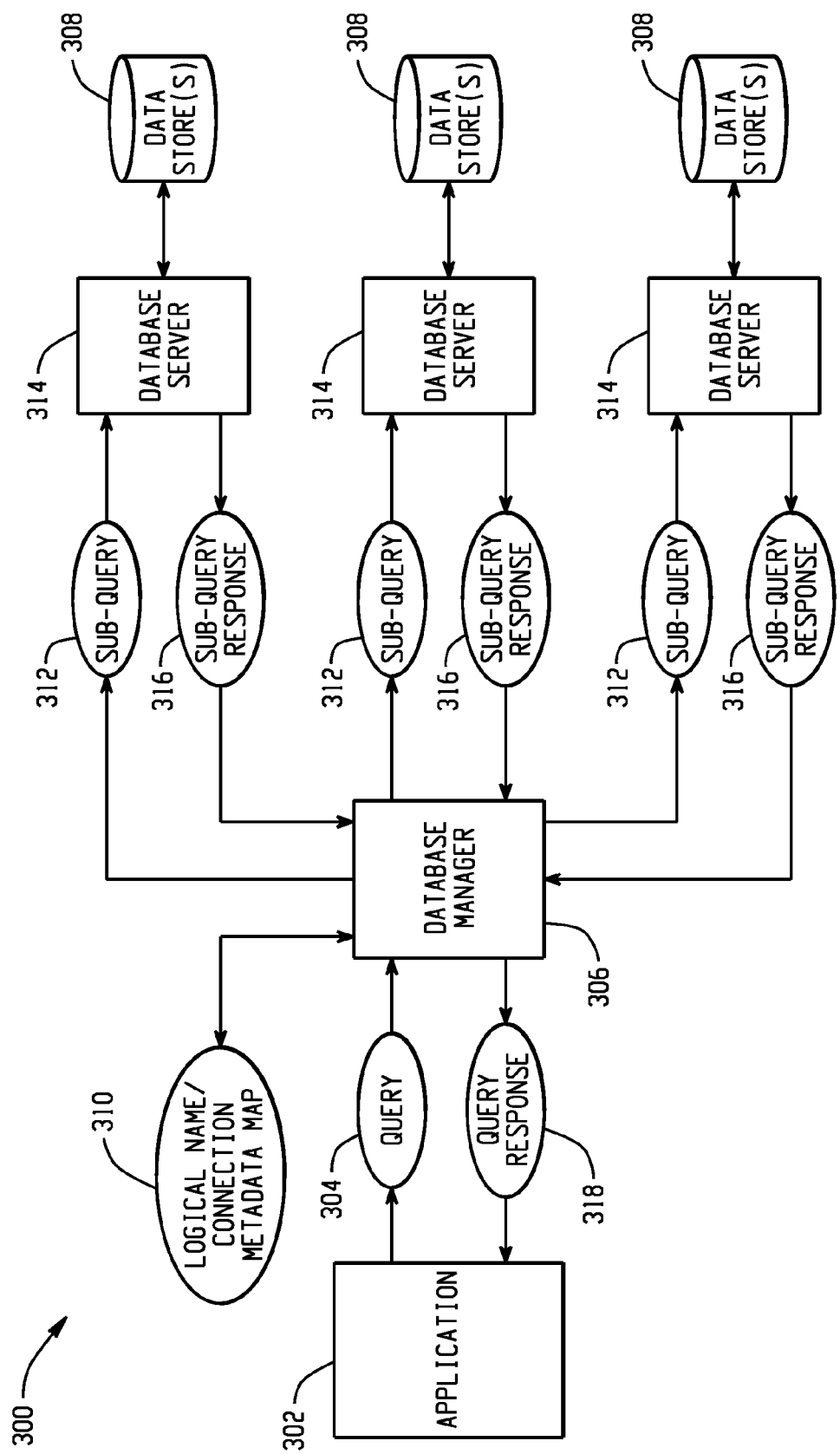
FIG. 3 is a block diagram depicting a system for responding to a query seeking data from heterogeneous data stores.

FIG. 3 is a block diagram depicting a system for responding to a query seeking data from heterogeneous data stores. An application 302 provides a query 304 for data to a database manager 306. The query 304 identifies multiple data stores 308 from which to access the data via the logical catalog part of the query. The database manager uses a logical name-to-connection metadata map 310 to resolve the data stores 308 to be accessed. The database manager divides the received query 304 into separate sub-queries 312 directed to data stored in particular data stores 308. Those sub-queries 312 are provided to database servers 314, which access data identified by a received sub-query from the data stores 308 to generate sub-query responses 316. The sub-query responses are received by the database manager 306 and combined to generate a query response 318 according to the received query 304. The query response 318 is transmitted to the application 302.

Figure 4:
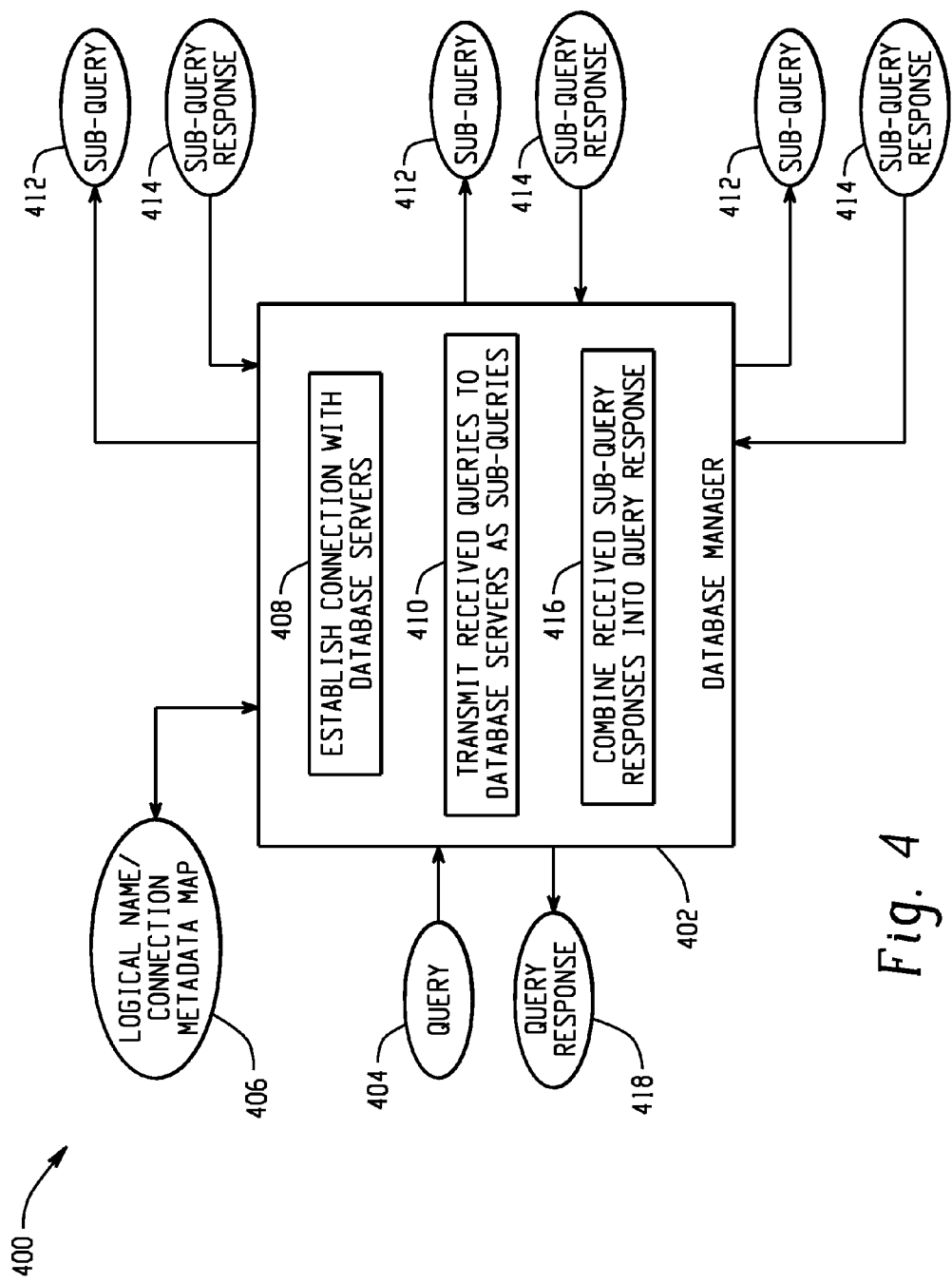
FIG. 4 is a block diagram depicting example operations performed by a database manager.

FIG. 4 is a block diagram depicting example operations performed by a database manager. The database manager 402 receives a query 404. The database manager 402 references the logical catalog part of a received query 404 and uses a logical name/connection metadata map 406 to resolve the one or more data sources to which the query is directed. The database manager 402 establishes a connection with those database servers at 408. At 410, the database manager 402 transmits portions of the received query 404 to the database servers as sub-queries 412. The database servers execute their received sub-queries 412 and access data sources to generate sub-query responses 414. The database manager combines the received sub-queries 414 at 416 into a query response 418 according to the received query 404. The query response 418 is outputted from the database manager 402.

Figure 5:
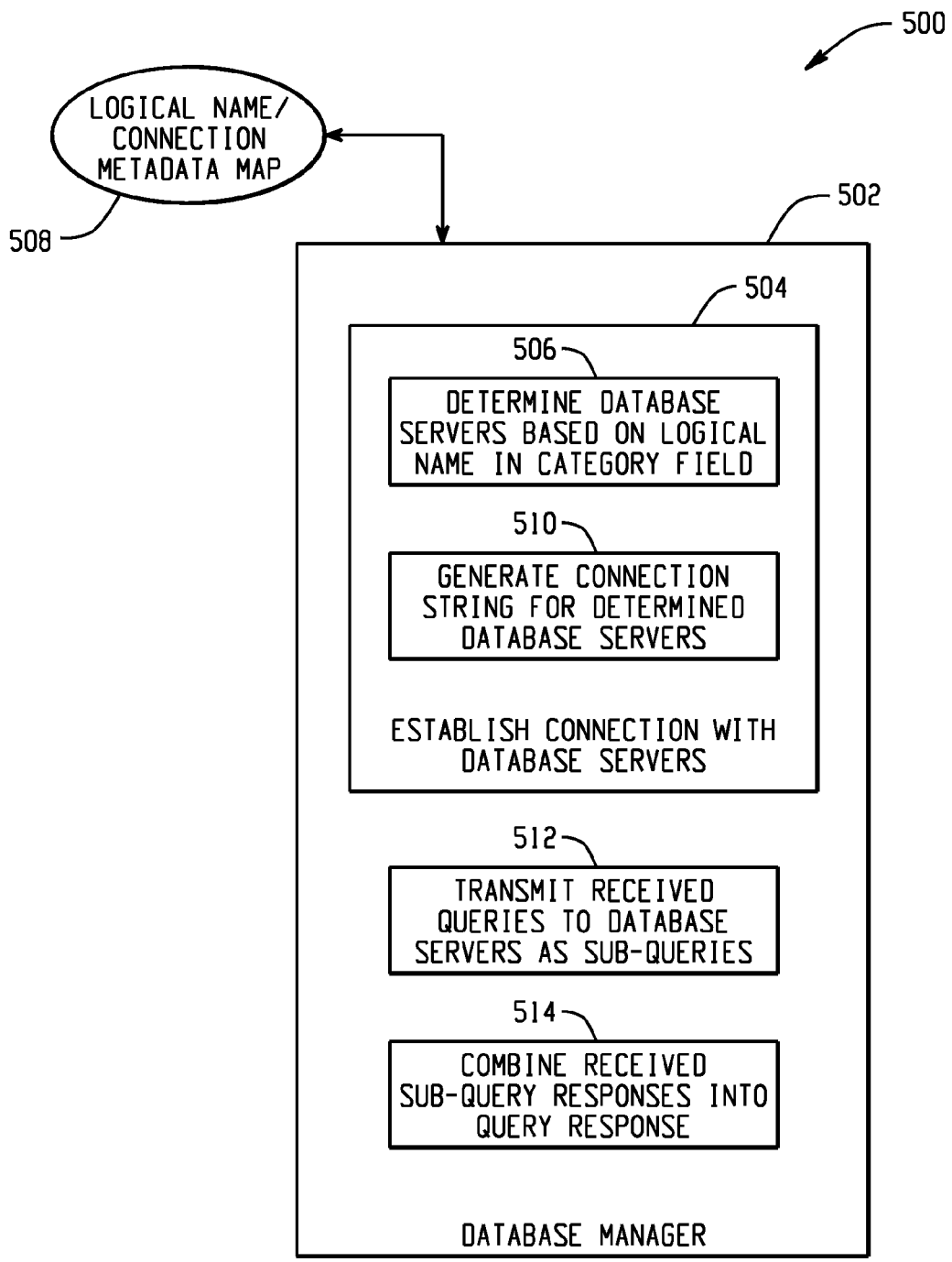
FIG. 5 is a block diagram depicting additional details of a database manager establishing a connection with database servers.

FIG. 5 is a block diagram depicting additional details of a database manager establishing a connection with database servers. A database manager 502 establishes a connection with database servers, as indicated at 504. To establish these connections, the database manager 502 determines data sources that should be connected to based on a logical catalog name or a logical data source identifier, as indicated at 506. The database manager 502 may utilize a logical name/connection metadata map 508 to determine the data sources referenced by the catalog or logical data source identifier. The connection metadata is retrieved from the map based on the content of the original connection string as follows: (1) If a logical catalog name is present, the associated data source identifier is retrieved from the map. (2) The logical data source identifier is used to retrieve detailed connection metadata for the data source. (3) The connection metadata is used to augment the original connection string for the data source. The database manager 502 may then generate a connection string for the determined data sources, as shown at 510. Once the database manager 502 has established connections with the data sources, the database manager 502 transmits received queries to database servers as sub-queries, as shown at 512, and combines received sub-query responses into a query response for outputting at 514.

Figure 6:
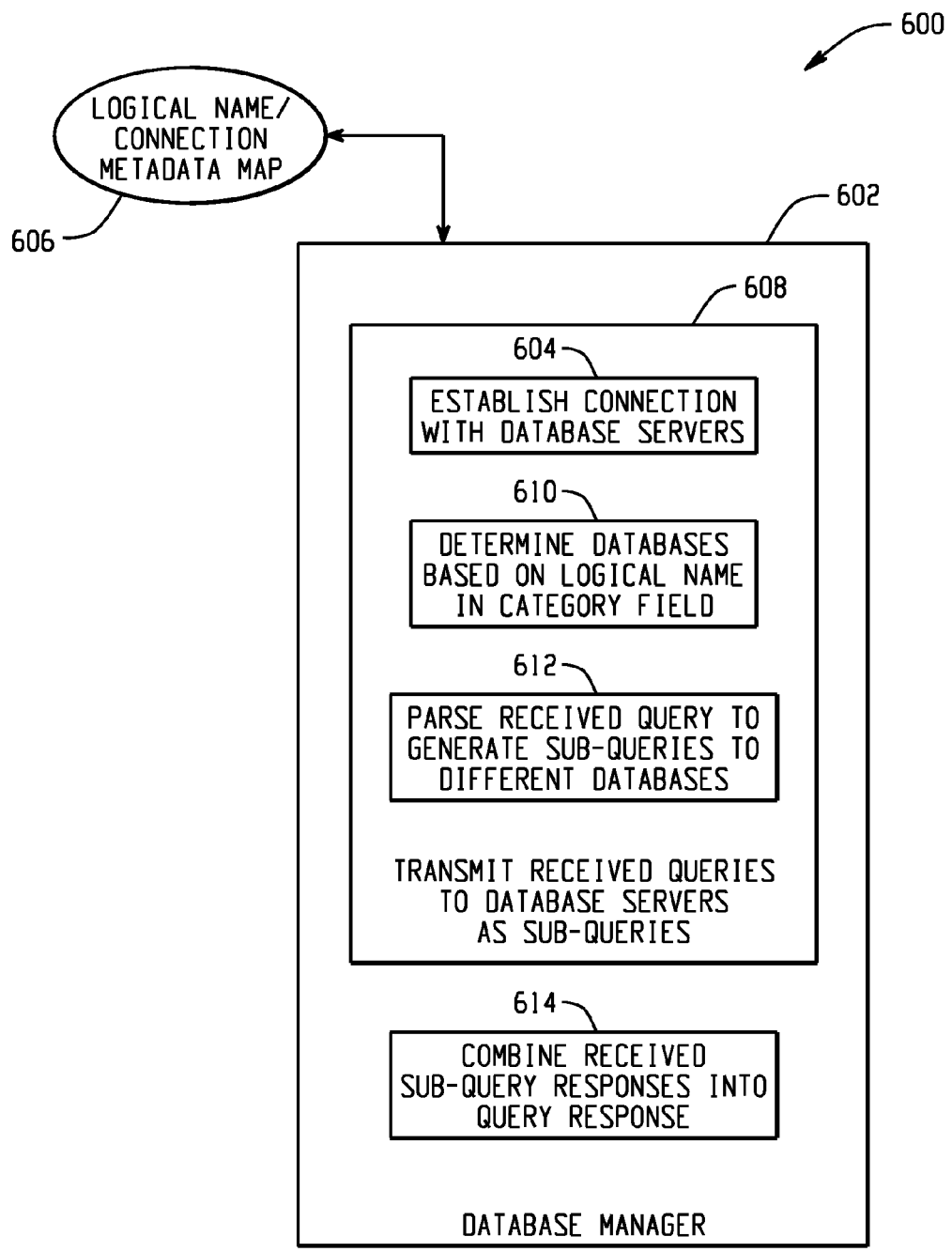
FIG. 6 is a block diagram depicting additional details of a database manager transmitting queries to database servers as sub-queries.

FIG. 6 is a block diagram depicting additional details of a database manager transmitting queries to database servers as sub-queries. The database manager 602 establishes connections with database servers at 604 and may utilize a logical name/connection metadata map 606 to do so. The database manager transmits received queries to database servers as sub-queries at 608. To do so, the database manager 602 determines databases to which to send the sub-queries based on a logical catalog name of a received query, as shown at 610. The database manager 602 may utilize the logical name/connection metadata map 606 to accomplish this determination. At 612, the database manager 602 parses the received query to generate sub-queries directed to the different databases determined at 610. Upon receipt of sub-query responses, the database manager 602 combines the received sub-query responses into a query response at 614.

Figure 7:
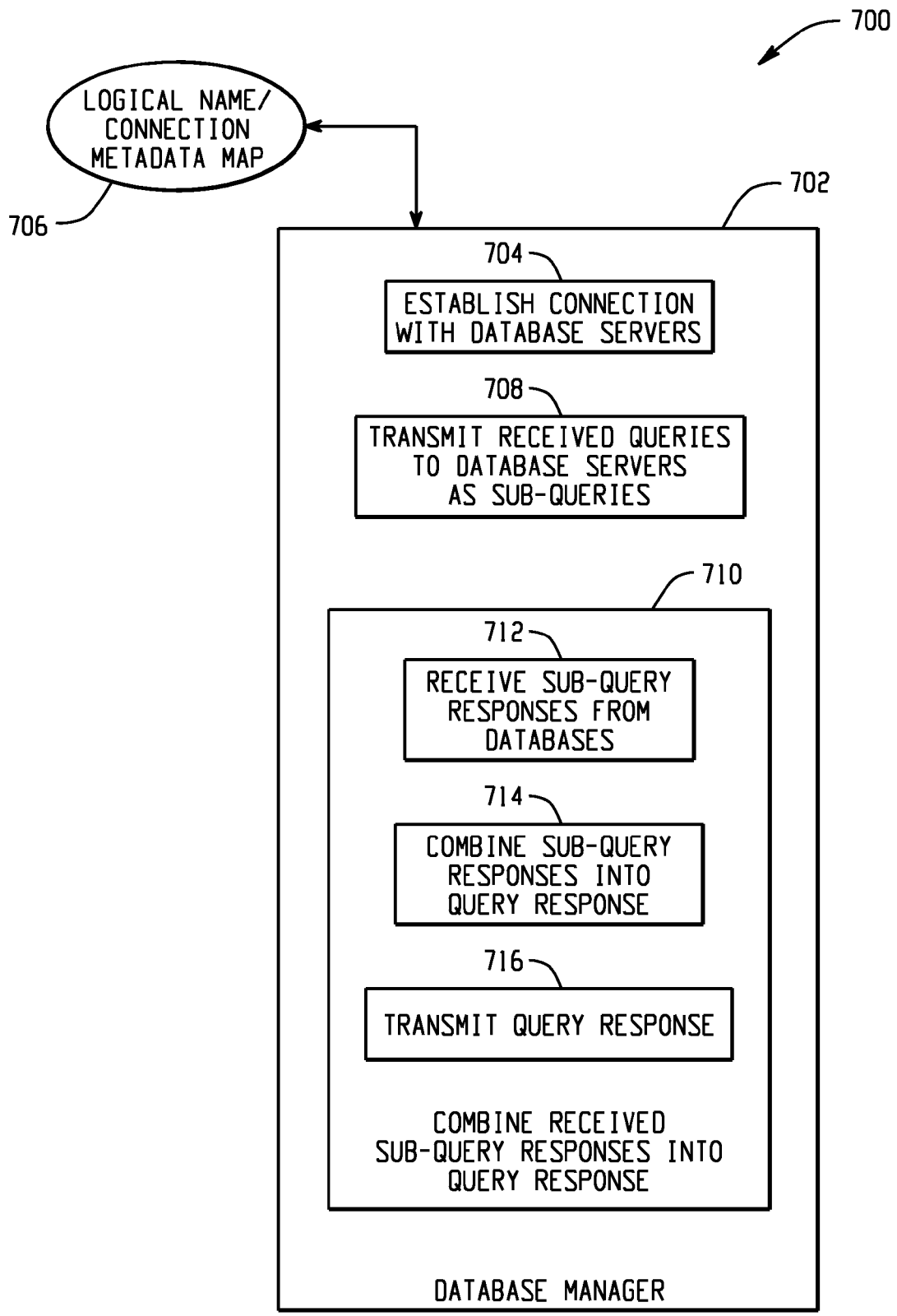
FIG. 7 is a block diagram depicting additional details of a database manager combining received sub-query responses into a query response.

FIG. 7 is a block diagram depicting additional details of a database manager combining received sub-query responses into a query response. The database manager 702 establishes connections with database servers at 704 and may utilize a logical name/connection metadata map 706 to do so. The database manager 702 parses the received query into sub-queries at 708 and transmits the sub-queries to identified database servers. At 710, the database manager combines sub-query responses into a query response according to an originally received query. That combining process may include receiving sub-query responses from the database servers 712, combining the received sub-query responses into a query response at 714, such that the query response is responsive to the data request of the originally received query, and transmitting the query response as an output at 716.

The following provides an example operational scenario. In the example, a user wants to connect to a DB2 and a SQL Server data source to access HR payroll data. The DB2 driver does not expose native catalogs, but the SQL Server driver does. A sample connection string that would provide heterogeneous capabilities to the user might look like:

```
DRIVER=TSSQL;CATALOG=*;CONOPTS=(
    (CATALOG=HR_WORLDHQ;DRIVER=DB2) ;
    (CATALOG=*;DATA_SERVICE=SQLSERVER;DRIVER=ODBC) )
```

The heterogeneous connection is composed of two single data source connections, one identified by the HR_WORLDHQ logical catalog name and the other with the SQLSERVER logical data source identifier. Detailed connection properties are then retrieved for each of the connections using the logical name-to-connection metadata map.

If SQL Server hosted native catalogs named "HR_SUBSIDIARY1" and "HR_SUBSIDIARY2", then the users set of accessible logical catalogs would be:
HR_WORLDHQ
HR_SUBSIDIARY1
HR_SUBSIDIARY2

Users would then be able to access data through those logical catalog names via standard SQL identifiers. For example, a user may issue:
SELECT * FROM HR_WORLDHQ.SCHEMA1.PAYROLL HQ_PAYROLL UNION
SELECT * FROM HR_SUBSIDIARY1.SCHEMA1.PAYROLL SUB1_PAYROLL UNION
SELECT * FROM HR_SUBSIDIAYR2.SCHEMA1.PAYROLL SUB2_PAYROLL The PAYROLL object from the HR_WORLDHQ logical catalog would be read from a DB2 server, where the PAYROLL objects from the HR_SUBSIDIARY1 and HR_SUBSIDIARY2 logical catalogs would be read from SQL Server.

If the SQL Server database also had a native catalog called HR_WORLDHQ, the user could connect with a slightly different connection string:

```
DRIVER = TSSQL; CATALOG=*;
CONOPTS= ( (CATALOG=HR_WORLDHQ;DRIVER=DB2) ;
          (CATALOG= (DENVER_OFFICE=HR_WORLDHQ) ;
          DATA_SERVICE=SQLSERVER;DRIVER=ODBC) )
```

This would avoid the name conflict with HR_WORLDHQ data coming from the DB2 server. A query from the DENVER_OFFICE logical catalog, such as:
SELECT * FROM DENVER_OFFICE.SCHEMA1.PAYROLL
would be converted to a query against the HR_WORLDHQ native catalog stored in SQL Server.

Figure 8A:
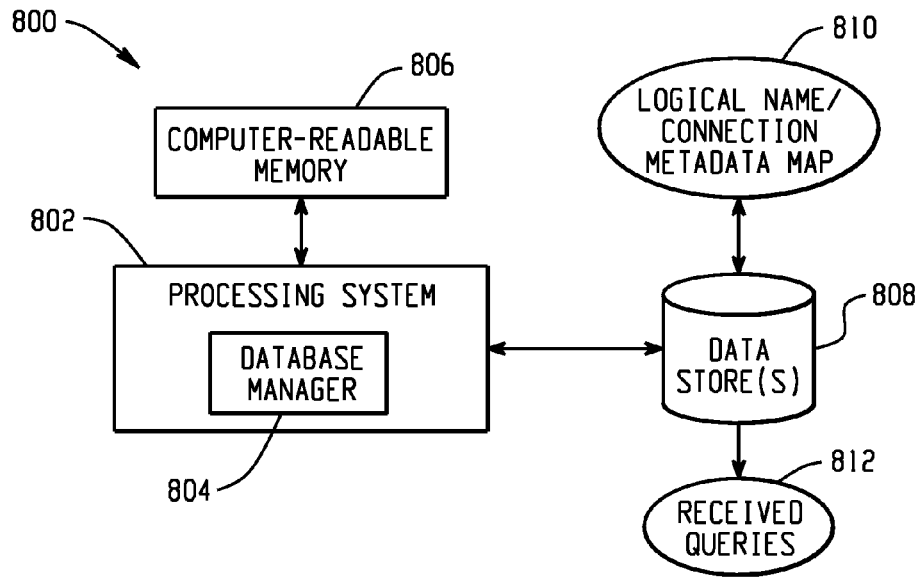
FIGS. 8A, 8B, and 8C depict example systems for use in implementing a database manager.
Figure 8B:
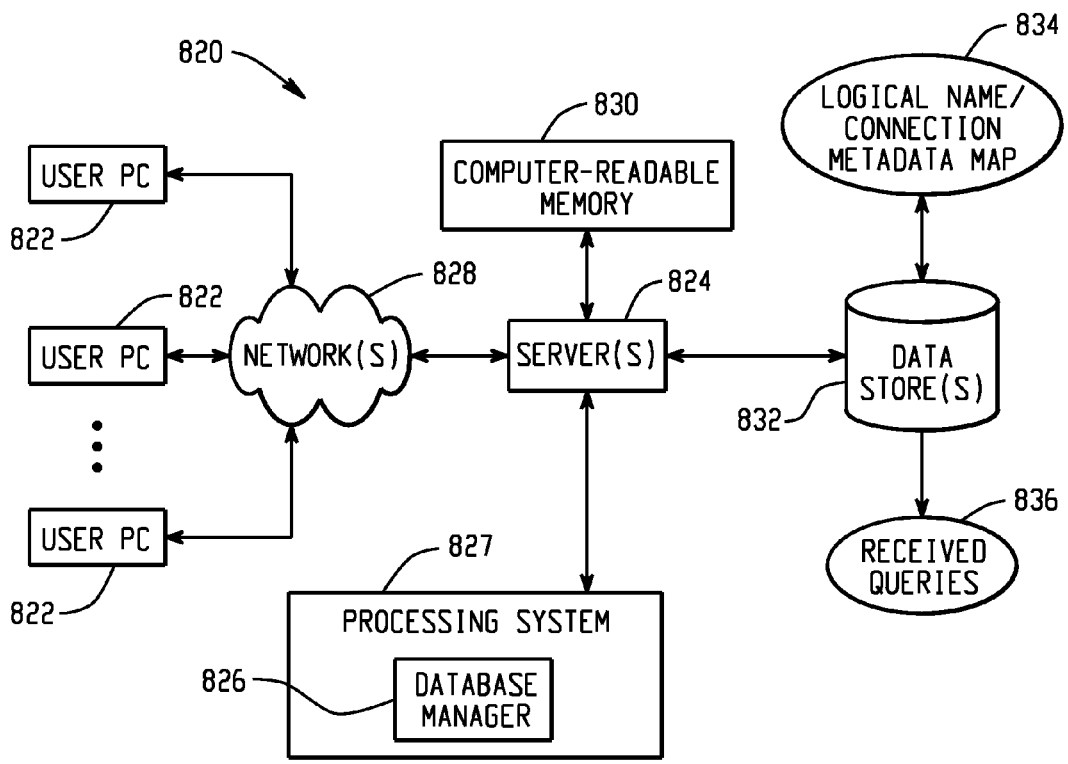
Figure 8C:
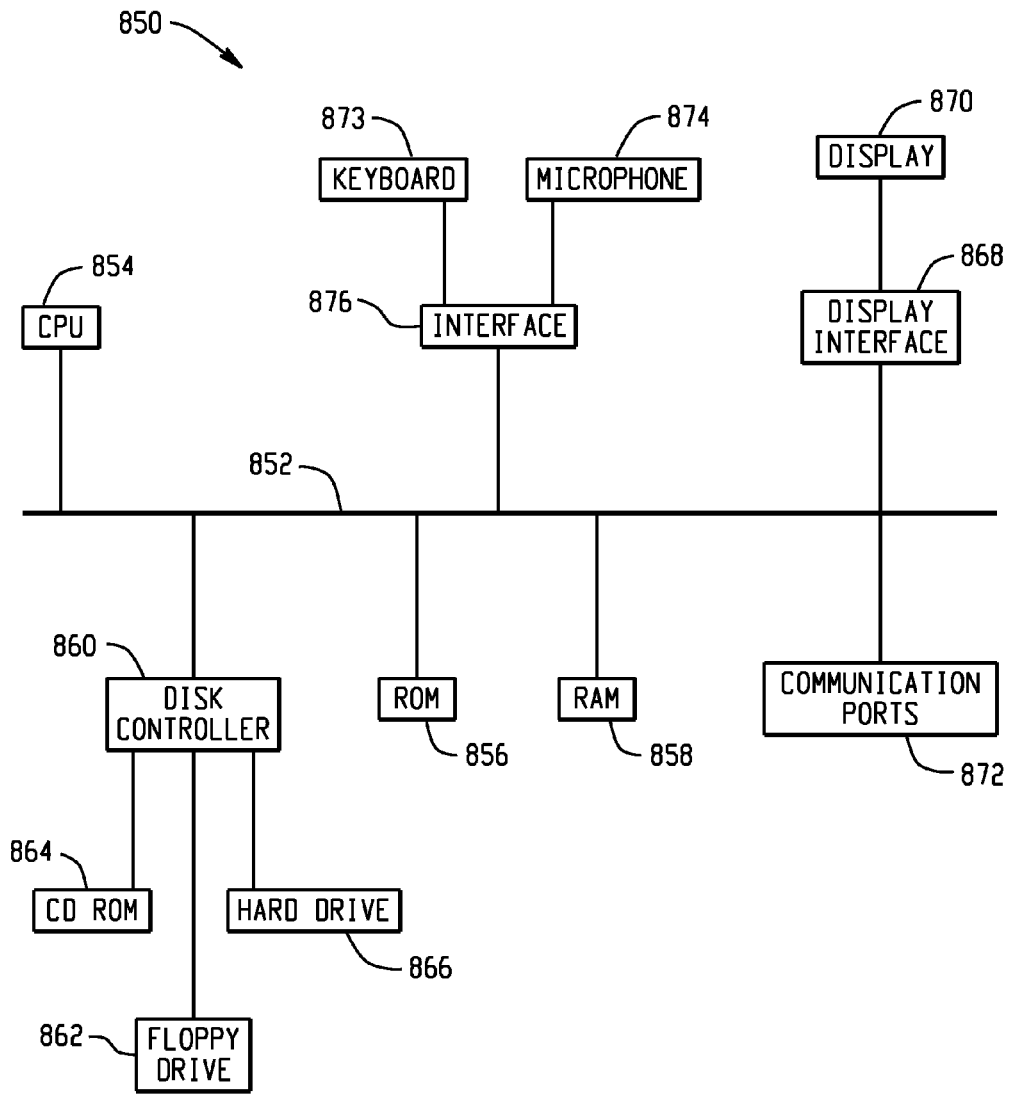

FIGS. 8A, 8B, and 8C depict example systems for use in implementing a database manager. For example, FIG. 8A depicts an exemplary system 800 that includes a standalone computer architecture where a processing system 802 (e.g., one or more computer processors) includes a database manager 804 being executed on it. The processing system 802 has access to a computer-readable memory 806 in addition to one or more data stores 808. The one or more data stores 808 may include a logical name/connection metadata map 810 as well as received queries 812.

FIG. 8B depicts a system 820 that includes a client server architecture. One or more user PCs 822 accesses one or more servers 824 running a database manager 826 on a processing system 827 via one or more networks 828. The one or more servers 824 may access a computer readable memory 830 as well as one or more data stores 832. The one or more data stores 832 may contain a logical name/connection metadata map 834 as well as received queries 836.

FIG. 8C shows a block diagram of exemplary hardware for a standalone computer architecture 850, such as the architecture depicted in FIG. 8A that may be used to contain and/or implement the program instructions of system embodiments of the present invention. A bus 852 may serve as the information highway interconnecting the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing the method of implementing a database manager. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 856 to be displayed on a display 870 in audio, graphic, or alphanumeric format. Communication with external devices may optionally occur using various communication ports 872.

In addition to the standard computer-type components, the hardware may also include data input devices, such as a keyboard 872, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. As additional examples, for example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-program product, tangibly embodied in a machine-readable non-transitory storage medium, including instructions configured to cause a data processing apparatus to perform operations including:
   receiving, at a computing device, a connection string, wherein the connection string:
   includes a logical catalog name associated with a first data source and a logical catalog name associated with a second data source, and
   provides connection properties of the first data source and connection properties of the second data source;
   retrieving connection information from a metadata map, wherein retrieving connection information includes retrieving additional connection properties of the first data source and additional connection properties of the second data source, wherein the metadata map associates a first catalog name identifier with the first data source and a second catalog name identifier with the second data source;

augmenting the connection string based on the additional connection properties of the first data source and the additional connection properties of the second data source, wherein the metadata map associates the first catalog name identifier with the first data source and the second catalog name identifier with the second data source;

establishing a connection with the first data source;

establishing a connection with the second data source, wherein establishing the connection with the first data source and establishing the connection with the second data source includes using the augmented connection string;

receiving a query, wherein the query includes the first catalog name identifier, the second catalog name identifier, a first object reference and a second object reference, wherein each of the object references identifies an object according to a catalog.schema.object identifier syntax;

determining that the first data source and the second data source are referenced by the query, wherein determining includes ascertaining that the metadata map associates the first catalog name identifier and the second catalog name identifier with the first data source and the second data source, respectively;

in response to determining that the first data source and the second data source are referenced by the query, generating a first sub-query for information from the first data source and a second sub-query for information from the second data source, wherein generating the first sub-query is based on the first object reference and wherein generating the second sub-query is based on the second object reference;

querying the first data source using the first sub-query;

querying the second data source using the second sub-query;

receiving data retrieved from the first data source based on the first sub-query;

receiving data retrieved from the second data source based on the second sub-query; and generating a query response by combining the received data retrieved from the first data source and the received data retrieved from the second data source.

2. The computer-program product of claim 1, wherein the operations further include:

generating the metadata map;

storing the metadata map, wherein the metadata map further includes a name and an address of the first data source and a name and an address of the second data source; and transmitting the query response.

3. The computer-program product of claim 1, wherein the first data source resides on a first server, and wherein the second data source resides on a second server different from the first server.

4. The computer-program product of claim 1, wherein the metadata map is a logical name-to-connection metadata map.

5. The computer-program product of claim 1, wherein the first data source is a DB2 data source, and wherein the second data source is a Structured Query Language (SQL) data source.

6. A system, comprising:

one or more processing units;

one or more non-transitory computer-readable storage mediums containing instructions configured to cause the one or more processing units to perform operations including:

receiving, at a computing device, a connection string, wherein the connection string:
includes a logical catalog name associated with a first data source and a logical catalog name associated with a second data source, and
provides connection properties of the first data source and connection properties of the second data source;

retrieving connection information from a metadata map, wherein retrieving connection information includes retrieving additional connection properties of the first data source and additional connection properties of the second data source, wherein the metadata map associates a first catalog name identifier with the first data source and a second catalog name identifier with the second data source;

augmenting the connection string based on the additional connection properties of the first data source and the additional connection properties of the second data source, wherein the metadata map associates the first catalog name identifier with the first data source and the second catalog name identifier with the second data source;

establishing a connection with the first data source;

establishing a connection with the second data source, wherein establishing the connection with the first data source and establishing the connection with the second data source includes using the augmented connection string;

receiving a query, wherein the query includes the first catalog name identifier, the second catalog name identifier, a first object reference and a second object reference, wherein each of the object references identifies an object according to a catalog.schema.object identifier syntax;

determining that the first data source and the second data source are referenced by the query, wherein determining includes ascertaining that the metadata map associates the first catalog name identifier and the second catalog name identifier with the first data source and the second data source, respectively;

in response to determining that the first data source and the second data source are referenced by the query, generating a first sub-query for information from the first data source and a second sub-query for information from the second data source, wherein generating the first sub-query is based on the first object reference and wherein generating the second sub-query is based on the second object reference;

querying the first data source using the first sub-query;

querying the second data source using the second sub-query;

receiving data retrieved from the first data source based on the first sub-query;

receiving data retrieved from the second data source based on the second sub-query; and generating a query response by combining the received data retrieved from the first data source and the received data retrieved from the second data source.

7. The system of claim 6, wherein the operations further include:

generating the metadata map;

storing the metadata map, wherein the metadata map further includes a name and an address of the first data source and a name and an address of the second data source; and transmitting the query response.

8. The system of claim 6, wherein the first data source resides on a first server, and wherein the second data source resides on a second server different from the first server.

9. The system of claim 6, wherein the metadata map is a logical name-to-connection metadata map.

10. The system of claim 6, wherein the first data source is a DB2 data source, and wherein the second data source is a Structured Query Language (SQL) data source.

11. A computer-implemented method, comprising:

receiving, at a computing device, a connection string, wherein the connection string:

includes a logical catalog name associated with a first data source and a logical catalog name associated with a second data source, and provides connection properties of the first data source and connection properties of the second data source;

retrieving connection information from a metadata map, wherein retrieving connection information includes retrieving additional connection properties of the first data source and additional connection properties of the second data source, wherein the metadata map associates a first catalog name identifier with the first data source and a second catalog name identifier with the second data source;

augmenting the connection string based on the additional connection properties of the first data source and the additional connection properties of the second data source, wherein the metadata map associates the first catalog name identifier with the first data source and the second catalog name identifier with the second data source;

establishing a connection with the first data source;

establishing a connection with the second data source, wherein establishing the connection with the first data source and establishing the connection with the second data source includes using the augmented connection string;

receiving a query, wherein the query includes the first catalog name identifier, the second catalog name identifier, a first object reference and a second object reference, wherein each of the object references identifies an object according to a catalog.schema.object identifier syntax;

determining that the first data source and the second data source are referenced by the query, wherein determining includes ascertaining that the metadata map associates the first catalog name identifier and the second catalog name identifier with the first data source and the second data source, respectively;

in response to determining that the first data source and the second data source are referenced by the query, generating a first sub-query for information from the first data source and a second sub-query for information from the second data source, wherein generating the first sub-query is based on the first object reference and wherein generating the second sub-query is based on the second object reference;

querying the first data source using the first sub-query;

querying the second data source using the second sub-query;

receiving data retrieved from the first data source based on the first sub-query;

receiving data retrieved from the second data source based on the second sub-query;

generating a query response by combining the received data retrieved from the first data source and the received data retrieved from the second data source.

12. The method of claim 11, further comprising:

generating the metadata map;

storing the metadata map, wherein the metadata map further includes a name and an address of the first data source and a name and an address of the second data source; and transmitting the query response.

13. The method of claim 11, wherein the first data source resides on a first server, and wherein the second data source resides on a second server different from the first server.

14. The method of claim 11, wherein the metadata map is a logical name-to-connection metadata map.

15. The method of claim 11, wherein the first data source is a DB2 data source, and wherein the second data source is a Structured Query Language (SQL) data source.

* * * * *